United States Patent
Ueda et al.

(10) Patent No.: US 8,258,690 B2
(45) Date of Patent: Sep. 4, 2012

(54) HIGH BRIGHTNESS INORGANIC ELECTROLUMINESCENCE DEVICE DRIVEN BY DIRECT CURRENT

(75) Inventors: Tadashi Ueda, Fukui (JP); Seikoh Yamauchi, Tokyo (JP); Jiro Kanamori, Ikoma (JP); Yoshisada Hayashi, Suita (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 709 days.

(21) Appl. No.: 11/246,200

(22) Filed: Oct. 11, 2005

(65) Prior Publication Data

US 2007/0080631 A1 Apr. 12, 2007

(51) Int. Cl.
*H05B 33/00* (2006.01)
*H01L 33/00* (2010.01)

(52) U.S. Cl. ......... 313/503; 313/502; 313/506; 428/917

(58) Field of Classification Search .......... 313/498–512; 428/917, 690; 252/301.4 R–301.6 P, 301.16
See application file for complete search history.

(56) References Cited

U.S. PATENT DOCUMENTS

| 4,983,469 | A * | 1/1991 | Huzino et al. | 428/690 |
| 6,251,531 | B1 * | 6/2001 | Enokida et al. | 428/690 |
| 6,259,423 | B1 * | 7/2001 | Tokito et al. | 345/76 |
| 6,562,292 | B2 | 5/2003 | Ito et al. | |
| 6,602,731 | B2 | 8/2003 | Andriessen | |
| 6,633,122 | B2 * | 10/2003 | Kijima et al. | 313/506 |
| 6,762,553 | B1 * | 7/2004 | Yokogawa et al. | 313/509 |
| 6,828,728 | B2 | 12/2004 | Ishii et al. | |
| 6,984,799 | B2 * | 1/2006 | Kawaguchi et al. | 200/512 |
| 7,151,338 | B2 * | 12/2006 | Hoffman | 313/503 |
| 2002/0024513 | A1 * | 2/2002 | Kota et al. | 345/204 |
| 2003/0080676 | A1 | 5/2003 | Vaddi et al. | |
| 2005/0024357 | A1 * | 2/2005 | Kota et al. | 345/204 |
| 2005/0214573 | A1 * | 9/2005 | Den et al. | 428/690 |
| 2006/0055294 | A1 * | 3/2006 | Song et al. | 313/110 |
| 2006/0081840 | A1 * | 4/2006 | Mori et al. | 257/40 |
| 2006/0254462 | A1 * | 11/2006 | Yano et al. | 106/452 |
| 2007/0013300 | A1 | 1/2007 | Takahashi et al. | |
| 2007/0080327 | A1 | 4/2007 | Ueda et al. | |

FOREIGN PATENT DOCUMENTS

| JP | 63-243205 | 10/1988 |
| JP | 05-074572 | 3/1993 |
| JP | 5-211093 | 8/1993 |

(Continued)

OTHER PUBLICATIONS

Chemical Abstracts citation 1931:47458; Coustal, R "The phosphorescence of zinc sulfide. I. The explosion method", Journal de Chinie Physique et de physico—Chemie Biologique, 1931, 28, pp. 277-298.*

(Continued)

*Primary Examiner* — Anne Hines
*Assistant Examiner* — Jose M Diaz
(74) *Attorney, Agent, or Firm* — Oblon, Spivak, McClelland, Maier & Neustadt, L.L.P.

(57) ABSTRACT

The present invention is characterized by a DC-driven inorganic EL element useful for mobile and other applications, the EL element including at least plural electrode layers, and a light emitter layer made of an inorganic composition, which is provided between the electrode layers, wherein the attainted brightness in the DC drive is 10000 cd/m² or more.

8 Claims, 2 Drawing Sheets

FOREIGN PATENT DOCUMENTS

| | | |
|---|---|---|
| JP | 08-183954 | 7/1996 |
| JP | 11-329718 | 11/1999 |
| JP | 2002003297 A * | 1/2002 |
| JP | 2002-153747 | 5/2002 |
| JP | 2002-241753 | 8/2002 |
| JP | 2002-313568 | 10/2002 |
| JP | 2003-073119 | 3/2003 |
| JP | 2003-173878 | 6/2003 |
| JP | 2004-265740 | 9/2004 |
| JP | 2006-143947 | 6/2006 |
| RU | 2 014 669 | 6/1994 |
| RU | 2 091 340 | 9/1997 |
| WO | 93/12934 | 7/1993 |
| WO | 2004/112437 | 12/2004 |
| WO | WO 2004/112437 | 12/2004 |

OTHER PUBLICATIONS

Kina, Hideki et al. "ZnS:Mn thin-film electroluminescent devices prepared by metalorganic chemical vapor deposition", Journal of Crystal Growth 169 (1996) pp. 33-39.

Toyama, T. et al. "Novel green thin-film electroluminescent devices utilizing ZnS nanocrystals doped with Tb compounds", Applied Surface Science 244 (2005), pp. 524-527.

Bol, Ageeth A. et al. "Luminescence of nanocrystalline ZnS:$Cu^{2+}$", Journal of Luminescence 99 (2002) pp. 325-334.

Xian, Hong et al. "Excitation and Radiative Efficiencies in ZnS:Mn Thin Film Electroluminescent Devices Prepared by Reactive Radio-Frequency Magnetron Sputtering", Japanese Journal of Applied Physics, Part 1: Regular Papers and Short Notes & Review Papers, vol. 33, No. 10, Oct. 1994, pp. 5801-5806.

U.S. Appl. No. 11/662,545, filed Mar. 12, 2007, Ueda et al.

T. Kryshtab, et al., "Preparation and Properties of thin ZnS:Cu films phosphors", Available online at www.sciencedirect.com, Thin Solid Films 515 (2006) 513-516.

Ryo Inoue, et al., "Luminescent properties of $Zn_xMg_{1-x}S$: Mn thin film electroluminescent devices", Journal of Crystal Growth 214/215 (2000) 931-934.

John P. Spoonhower, "Radiative Recombination at Ir3+ Sites in doped AgBr" Radiation Effects, vol. 73, 1983, pp. 25-29.

Russian Office Action dated Aug. 12, 2010 as received in the corresponding Russian Application No. 2008118345/15(021180) filed Oct. 10, 2006 w/Partial English Translation.

Letters to JTP, 2001, vol. 27, No. 13, pp. 10-15 w/partial English translation.

Moscow-Leningrad, "Chemistry", 1966, pp. 10,11, 91 w/partial English translation.

Great Encyclopedic Polytechnic Dictionary ed. By A. Yu. Ishlinsky, Moscow, Great Russian Encyclopedia Scientific Publisher, 2000, p. 405 w/partial English translation.

* cited by examiner

HIGH BRIGHTNESS INORGANIC ELECTROLUMINESCENCE DEVICE DRIVEN BY DIRECT CURRENT

BACKGROUND OF THE INVENTION

1. Field of the Invention

The present invention relates to an inorganic EL element capable of emitting light with direct current.

2. Description of the Related Art

Electroluminescence (referred to as "EL" in the present invention) elements are roughly classified into inorganic EL elements and organic EL elements due to the difference of their light emitter materials. The inorganic EL element using an inorganic material for the light emitter has a characteristic that the emission lifetime is longer than that of the organic EL element using an organic material for the light emitter. Thereby the inorganic EL element has been put to practical use mainly for applications requiring high durability, such as cash register display units, in-vehicle monitors, and clock backlights.

FIG. 1 is a perspective view showing a key portion of a representative configuration of a conventional inorganic EL element. An EL element 10 is a thin film EL element of double insulation type, which is formed by laminating lower electrodes 12, a lower insulator layer 13, a light emitter layer 14, an upper insulator layer 15 and upper electrodes 20 in the described order on a transparent substrate 11 having an electric insulation property (see FIG. 3 of JP-A No. 2004-265740).

As the transparent substrate 11, there is employed a transparent substrate such as a blue plate glass commonly used in LCD (Liquid Crystal Display) and PDP (Plasma Display Panel). The lower electrode 12 is generally composed of ITO (Indium Tin Oxide) with a film thickness of about 0.1 to 1 μm. The upper electrode 20 is composed of a metal such as Al. The lower insulator layer 13 and the upper insulator layer 15 are thin films with a thickness of about 0.1 to 1 μm each formed by a method such as sputtering or vacuum evaporation, which are generally made of $Y_2O_3$, $Ta_2O_5$, AlN, $BaTiO_3$ and other materials. The light emitter layer 14 is generally composed of a light emitter containing a dopant which is to be an emission center, and its film thickness is generally about 0.05 to 1 μm.

In the conventional EL element having such a configuration, when the electrodes are applied with an alternative voltage or a pulse voltage from an AC power source 21, the light emitter layer 14 produces electroluminescence, and its output light is taken out from the transparent substrate 11 side. In the use of the inorganic EL element as a display, the lower electrodes 12 and the upper electrodes 20 are provided in a stripe-like pattern, wherein one side is set to the row electrodes and the other side is set to the column electrodes, and both of the electrodes are arranged so that the stretching directions thereof are orthogonal to each other. In other words, the matrix electrodes are formed by the electrodes 12 and the electrodes 20, in which the portions of the light emitter layer at the crossovers of the row and column electrodes represent pixels, thereby when the alternative voltage or pulse voltage is selectively applied thereto, a specific pixel is emitted, and its output light is taken out from the transparent substrate 11 side.

However, the above inorganic element requires to be applied with an alternative voltage of 100 V or more at a frequency in the range of several hundreds Hz to dozens KHz, being less and less used in mobile devices such as notebook computers and cellular phones that use batteries, due to the fact that the DC-AC conversion element is necessary and for other reasons.

On the other hand, attention has been recently focused on the organic element as an element capable of being driven by a direct current, which is commercialized for the in-vehicle applications and cellular phones that use batteries. However, a fluorescent organic solid which is a material of the light emitting layer of the organic EL element is weak against moisture, oxygen and other substances. Also, the characteristics of the electrode provided on the light emitting layer directly, or through a hole injection layer or electron injection layer, are likely to deteriorate due to oxidation. Thus, there is a problem that when the conventional organic EL element is driven in the atmosphere, the emission characteristic deteriorates rapidly. Various efforts are made to cope with this problem (for example, see JP-A No. Hei 11-329718), but the problem is not perfectly solved from the point of view of the lifetime.

Thus, the direct current inorganic EL element capable of being driven by direct current has been studied with taking advantage of the feature of the long lifetime of the inorganic EL (for example, JP-A No. Hei 5-74572, JP-A No. 2002-313568).

However, in the case of the conventional direct current inorganic EL elements including those described in the above Patent Documents 3 and 4, mostly there is no description about the brightness, and the approach to realize high brightness has not been sufficiently carried out.

SUMMARY OF THE INVENTION

Thus, the present invention is made in light of the above described circumstances, and an object is to provide an inorganic EL element that can be driven by direct current and is useful for high-brightness applications such as lights and light sources in the use of mobile applications and the like.

In order to solve the above described problem, the direct current inorganic EL element of the present invention, including at least plural electrode layers and a light emitter layer made of an inorganic composition and provided between the electrode layers, is characterized in that the attained brightness in the DC drive is 10000 cd/m$^2$ or more.

Herein, the term "brightness" refers to a value of which light with a measured viewing angle of 1 degree, when viewed from the normal direction of the light emitting surface of the inorganic El element, is measured by a telescopic luminance meter.

Further, the inorganic EL element of the present invention is characterized in that the thickness of the EL light emitter layer is 0.05 μm or more and 100 μm or less. Optimizing the thickness of the light emitter layer enables low voltage drive and prevention of short circuit between the electrodes.

Further, the inorganic EL element of the present invention is characterized in that the surfaces between the above described two electrode layers are both made of different compositions. Changing and optimizing the compositions of the surfaces between the electrodes allows to increase the performances, such as to increase the emission efficiency and the lifetime due to the improvement of the adhesion strength with the electrodes.

According to the present invention, there can be provided a DC driven inorganic EL emission element useful for mobile applications and other applications. In addition, a light source available for various applications can be provided by having high brightness.

DETAILED DESCRIPTION OF THE INVENTION

Figure 1:
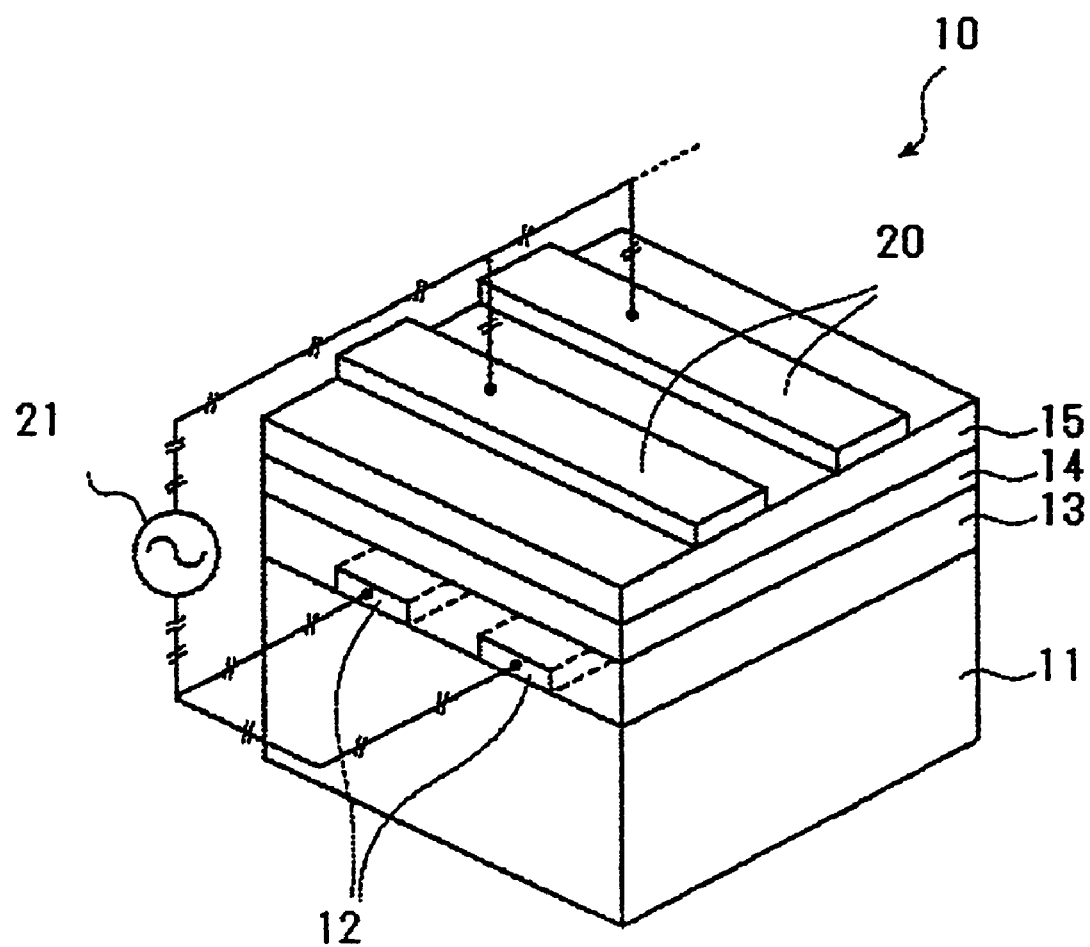
FIG. 1 is a perspective view showing a key portion of a representative configuration of a conventional inorganic EL element.

The best mode for carrying out the present invention will be described in detail below.

First, the description will be made about the configuration of the inorganic EL element of an embodiment.

The inorganic EL element of the embodiment includes at least a light emitter layer made of an inorganic composition between plural electrodes, wherein the attained brightness in the DC drive is 10000 cd/m$^2$ or more.

As the first electrode layer in the light output surface side of the inorganic light emitter layer, a thin film of ITO, IZO, silver or other materials are generally used because a high transmission rate is required. In the case of realizing high brightness, a large amount of current flows, so that the surface resistivity is preferably low in order to suppress heat due to the resistance value of the electrode layer. The surface resistivity is preferably 5 Ω/□, and more preferably 1 Ω/□ or less.

Incidentally, in the case of performing the end face emitting operation that emits light from the end portions of the light emitter layer instead of outputting light via the transparent substrate, the first electrode layer is not required to be transparent, thereby a reflection layer may be formed using such metals as silver, copper, and aluminum.

The light emitter layer must be an inorganic composition capable of emitting light with high brightness. The production method of the material is not specifically limited, but includes a method that makes the inorganic composition have a specific structure by an explosion method, for example. Preferably, the characteristic of the material is that it emits light by PL (Photoluminescence). If the thickness of the light emitter layer is too thick, the voltage between the electrodes rises in order to obtain an electric field strength required for light emission, so that from the point of view of making the voltage lower, the thickness thereof is preferably 100 μm or less, more preferably 50 μm or less. If the thickness of the light emitter layer is too small, the electrodes layers on the both sides of the EL light emitter layer are likely to short-circuit, so that from the point of view of preventing this, the thickness thereof is preferably 0.05 μm or more, more preferably 0.1 μm or more.

The deposition method used herein includes a vacuum evaporation method which is a physical evaporation method under vacuum, and methods of depositing an inorganic material, such as sputtering and ion plating. The material used for the inorganic EL light emitting layer for achieving high brightness is essentially stable but has a high melting point, so that it is preferable to use a deposition method, such as electron beam (EB) evaporation capable of evaporating a material having a high melting point and also capable of suppressing contamination from the crucible holding the material and the like, or sputtering when the inorganic material can be targeted.

Further, the method of changing the compositions in the two surfaces between the light emitter layer and the electrodes includes, for example, a method that sets the second component to another evaporation source or target to change the film forming rate of the second component. It is also allowable to set the different two types of compositions to separate evaporation sources or targets to gradually change their film forming rates depending on the progress of deposition, or to change the film forming target from the first material to the second material during deposition.

As the second electrode layer on the backside of the light emitter layer, it is not limited to a specific one. For example, there is a method of forming the element by depositing a common metal such as silver or aluminum by the vacuum evaporation method or other methods, and when forming the element from the backside substrate, a method of making a conductive plane substrate such as a silicon substrate serves as the electrode.

EXAMPLE

The present invention will be described in grater detail with reference to the example and comparative example, but the present invention is not limited to these examples.

Figure 2:
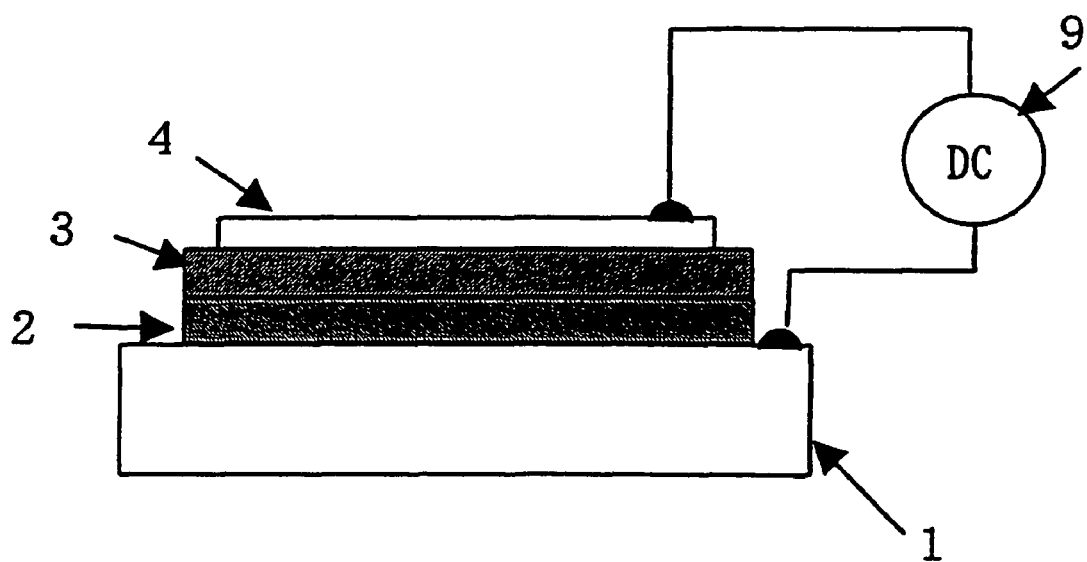
FIG. 2 is a schematic cross-sectional view showing a key portion of a representative configuration of a direct current inorganic EL element according to the present invention.

The EL element having the configuration shown in FIG. 2 has been produced.

(Production of Luminescent Material)

An amount of 100 g of zinc sulfide is blended with 0.27 g of manganese sulfide, 0.5 g of zinc oxide, 3 g of barium fluoride, 3 g of magnesium chloride, and 0.012 g of iridium chloride, and the blended materials are put in a reaction chamber of a high pressure-resistant container, followed by adding trinitrotoluene. The reaction container is sealed to reduce the pressure therein to 0.01 mmHg, and the reaction chamber is heated to about 450 degrees to induce an explosion. After confirmation that the explosion reaction has been generated within the container, the reaction chamber is cooled and the rough product is corrected. This is put into water and stirred, and then suspended solids are removed. The water content is removed, and then the product is dried at a room temperature to obtain 15 g of a calcined product. The calcined product is milled by a milling machine, followed by adding thereto 5 mg of gallium arsenide and mixing. The mixture is heated at a temperature of 700° C. under nitrogen atmosphere for 8 hours to obtain a rough emitter. The rough emitter is added with a glacial acetic acid, stirred, and then dissolved materials are removed. Next, deionized water is added, and the mixture is stirred to wash the product, and then the water is removed. The resulting product is milled and powdered to make it serve as a luminescent material.

(Production of EL Element)

On a substrate with a silicon single crystal as the backside electrode, the luminescent material is deposited by an EB evaporation unit through a 2×2 mm metal mask which is to be a luminescent part. More specifically, the above described luminescent material is provided to a first evaporation source and selenium is provided to a second evaporation source, wherein the two materials are laminated at the same time, at a constant deposition rate from the first evaporation source, and from the second evaporation source, at a deposition rate so that the weight ratio of selenium is 0.5% or less in the first half of the deposition process and that the weight ratio of selenium is about 1% in the second half of the deposition process. The ratio of the time period of the first half and the last half is about 1:1, and the total thickness of the laminated materials is about 20 μm in total. Next, using another evaporation source within the same chamber, silver is laminated at a thickness of less than 1 μm to make it serve as the first electrode, whereby the EL element is produced.

(Evaluation of EL Element)

The silver electrode of the produced EL element is connected with a positive DC power source and the silicon substrate electrode thereof is connected with a negative DC power source, in which the voltage is gradually increased to obtain the attained brightness of 375000 cd/m$^2$.

Comparative Example

The luminescent material is produced by the same method as in the example except that the contents of the reaction chamber are heated at 1200° C. for 5 hours instead of being exploded as in the example, followed by cooling. The EL element is produced by the same method as in the example. In this case, the brightness can only attain 6000 cd/m$^2$.

What is claimed is:

1. An inorganic EL element comprising at least two electrode layers to which a DC drive is connected, and a light emitter layer made of an inorganic composition that comprises iridium, which is provided between the electrode layers, wherein an attained brightness in the DC drive is 10000 cd/m2 or more, wherein the inorganic composition is obtained through an explosion method.

2. The inorganic EL element according to claim 1, wherein the thickness of said EL light emitter layer is 0.05 μm or more and 100 μm or less.

3. The inorganic EL element according to claim 1 or claim 2, wherein said EL light emitter layer has surfaces between said two layers of electrodes, the two surfaces being made of different compositions.

4. The inorganic EL element according to claim 1, wherein at least one electrode comprises silicon single crystal.

5. The inorganic EL element according to claim 4, wherein at least one other electrode comprises silver.

6. The inorganic EL element according to claim 1, wherein an attained brightness in the DC drive is at least 375000 cd/m2.

7. The inorganic EL element according to claim 1, wherein said inorganic composition comprises zinc sulfide.

8. The inorganic EL element according to claim 1, wherein the inorganic composition further comprises zinc sulfide, magnesium sulfide, zinc oxide, barium fluoride, magnesium chloride, iridium chloride and gallium arsenide.

* * * * *